(12) United States Patent
Young et al.

(10) Patent No.: US 7,139,781 B2
(45) Date of Patent: Nov. 21, 2006

(54) MANAGING FILESYSTEM VERSIONS

(75) Inventors: Jason C. Young, Portland, OR (US);
Rajagopal Ananthanarayanan, Milpitas, CA (US); Randal C. Burns, Washington, DC (US); Darrell D. E. Long, Soquel, CA (US); Robert M. Rees, Los Gatos, CA (US); Ralph A. Becker-Szendy, Los Gatos, CA (US); James J. Seeger, Portland, OR (US); David M. Wolfe, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 10/427,391

(22) Filed: Apr. 29, 2003

(65) Prior Publication Data
US 2004/0220979 A1 Nov. 4, 2004

(51) Int. Cl.
*G06F 12/00* (2006.01)
*G06F 17/30* (2006.01)

(52) U.S. Cl. ............ 707/204; 707/202; 707/203
(58) Field of Classification Search ........... 707/202, 707/203, 204; 714/37, 15
See application file for complete search history.

(56) References Cited

U.S. PATENT DOCUMENTS

| | | | |
|---|---|---|---|
| 5,287,496 A | 2/1994 | Chen et al. | 707/203 |
| 5,956,731 A | 9/1999 | Bamford et al. | 707/201 |
| 6,289,474 B1 * | 9/2001 | Beckerle | 714/37 |
| 6,519,712 B1 * | 2/2003 | Kim et al. | 714/15 |
| 6,895,416 B1 * | 5/2005 | Gara et al. | 707/204 |

FOREIGN PATENT DOCUMENTS

WO WO 9715890 5/1997

OTHER PUBLICATIONS

Santry et al., "Elephant: The File System That Never Forgets", Hot Topics in Operating Systems, 1999. Proceedings of the Seventh Workshop on Mar. 29-30, 1999, pp. 2-7.*

(Continued)

*Primary Examiner*—Jeffrey Gaffin
*Assistant Examiner*—Michael J. Hicks
(74) *Attorney, Agent, or Firm*—Lieberman & Brandsdorfer, LLC

(57) ABSTRACT

A system and method for managing logical versions of a filesystem made through a near-instantaneous copy process is provided. Each logical version of the filesystem, including the primary version, is assigned a unique epoch number or other identifying value, and each filesystem object is assigned two epoch numbers that define the space of logical versions for which the object exists. A list of all valid epoch numbers are maintained in a version table. The near-instantaneous creation of a logical version of the filesystem requires inserting a unique epoch number entry in the version table (106) and the next epoch number to the new logical version. An original state of the system is preserved through the use of a copy-on-write procedure for filesystem objects that are reference by that logical filesystem version (120). Accordingly, filesystem versions are maintained and original states of previous states of the logical filesystem versions are preserved.

59 Claims, 12 Drawing Sheets

OTHER PUBLICATIONS

Soules et al., "Metadata Efficiency in a Comprehensive Versioning File System", Second USENIX Conference on File and Storage Technologies; San Francisco, CA, Mar. 31-Apr. 2, 2003.*

Santry et al., "Decidin When to Forget in the Elephant File System", ACM Symposium on Operating☐☐System Principles. Published as Operating Systems Review, 33(5):110-123. ACM, 1999.*

Elnozahy et al., "A Survey of Rollback-Recovery Protocalls in Message-Passing Systems", ACM Computing Surveys, vol. 34, No. 3; Sep. 2002, pp. 375-408.*

Lee and Thekkath, "Petal: Distributed Virtual Disks", ASPLOS, vol. VII, pp. 84-92, Oct. 1996.

* cited by examiner

MANAGING FILESYSTEM VERSIONS

BACKGROUND OF THE INVENTION

1. Technical Field

This invention relates to a method and system for managing versions of a filesystem. More specifically, the invention relates to creating and removing logical versions of the filesystem.

2. Description of the Prior Art

Systems and method for managing logical filesystem versions are known in the art. FIG. 1 is a block diagram 10 of a node 12 running a single operating system instance. The node 12 has node software 14 with filesystem management logic 16. In addition, the node is in communication with local storage media 18 that includes file data space and system metadata space 19. The filesystem management logic 16 functions to manage logical versions of the filesystem. The prior art system assigns an epoch number to a logical version of the filesystem but does not include an identification system for objects within the filesystem. To determine if an object has been deleted in the prior art filesystem version, additional records must be reviewed to determine what the death epoch number for the object would have been. Accordingly, the, prior art system does not include logic for identifying objects within the logical filesystem versions that determine a range of logical filesystem versions in which the object is valid.

Similarly, FIG. 2 is a block diagram 20 of a client/server node 22 in communication with a storage area network 30. The client/server node has software 24 with filesystem logic 26. In addition, the client/server node 22 is in communication with the storage area network 30 that includes file data space 32 and filesystem metadata space 34. In opening the contents of an existing file object on the storage media in the storage area network 30, a client contacts the client/server node 22 to obtain metadata. Metadata supplies the client with information about a file, such as its attributes and location on storage devices. The client/server node 22 performs a look-up of metadata information for the requested file within the metadata 34 of the storage area network 30. The client/server node 22 communicates file metadata to the requesting client, including the location of all data blocks making up the file. Once the client knows the data block location(s), the client can access the data for the file directly from a shared storage device in communication with the storage area network 30. In addition, the client/server node 22 includes software 24 with filesystem logic 26. The filesystem logic 26 functions to create and manage near-instantaneous logical versions of a filesystem. However, the filesystem logic 26 assigns an epoch number to a logical version of the filesystem but does not include a two part identification system for objects within the filesystem. Accordingly, the prior art system does not include filesystem logic for identifying objects within the logical filesystem versions that determine a range of logical filesystem versions in which the object is valid.

Other examples of creation of a logical filesystem version is disk mirroring. With this method, two physical logical versions of the filesystem data are maintained on two disks. A near-instantaneous version of the filesystem is created by breaking the mirror apart. As such, the logical version of the filesystem data incurs the cost of duplicating the required amount of storage space. In addition, this method requires creation of another mirror pair before a subsequent logical version of the filesystem may be taken. Another example of creating a filesystem logical version is a log based filesystem in which a copy-on-write procedure is performed for every modification of a filesystem object. A periodic review of the state of the system is conducted to record the state of the filesystem and to remove non-referenced logical filesystem versions. In addition, a background process continuously unites the contents of the filesystem. Accordingly, both of these example are limited in efficiency and increased storage capacity requirements.

In known prior art systems that support logical versions of a filesystem, there are limitations associated with the requirements of increased storage space and background processing. Therefore, there is a need for near-instantaneous creation and storage of logical versions of a filesystem that both eliminates the requirement of increased storage capacity and background processing.

SUMMARY OF THE INVENTION

This invention comprises a method and system for managing logical versions of a filesystem.

In a first aspect of the invention, a method for managing logical versions of a filesystem is provided. An epoch value is assigned to a logical version of the filesystem. A pair of epoch values is assigned to a filesystem object. A version table of all valid filesystem epoch values is maintained, with each listed epoch value corresponding to a valid logical versions of the filesystem. A near-instantaneous logical verison of the filesystem is created at a single point-in-time by storing a current epoch value of the logical version of the filesystem in the version table in persistent storage, and monotonically incrementing a current filesystem epoch value. The object epoch value pair preferably determines a range of logical filesystem version in which the object is valid.

In a second aspect of the invention, a data storage system is provided. The system includes a logical filesystem version identified by an epoch value, and a filesystem object identified by a pair of epoch values. A version table is used to maintain a list of all valid filesystem epoch values. Each listed epoch value corresponds to a valid logical version of the filesystem. A version manager is provided to create a near-instantaneous logical verison of the filesystem at a single point-in-time. The current epoch value associated with a current logical verison of the filesystem is adapted to be stored in the version table in persistent storage. In addition, the version manager monotonically increases a current filesystem epoch value. The object epoch value pair preferably determines a range of a logical version of the filesystem in which the object is valid.

In a third aspect of the invention, an article in a computer-readable signal-bearing medium is provided. Means in the medium for assigning an epoch value to a logical version of a filesystem and for assigning a pair of epoch values to a filesystem object is provided. In addition, means in the medium for maintaining a version table of all valid filesystem epoch value is provided, with each listed epoch value corresponding to a valid logical version of the filesystem. Finally, means in the medium for creating a near-instantaneous logical version of the filesystem at a single-point-in-time is provided. The filesystem creation means stores a current epoch value of the logical version of the filesystem in the version table in persistent storage and monotonically increments a current filesystem epoch value. The object epoch value pair preferably determines a range of a logical version of the filesystem in which the object is valid.

In a fourth aspect of the invention, a method for managing logical versions of a filesystem is provided. Filesystem logic is embedded within server software of a node running a single operating instance. The logic is adapted to communicate with the metadata space of local storage media of the node. An epoch value is assigned to a logical version of the filesystem. A pair of epoch values is assigned to a filesystem object. A version table of all valid filesystem epoch values is maintained, with each listed epoch value corresponding to a valid logical versions of the filesystem. A near-instantaneous logical verison of the filesystem is created at a single point-in-time by storing a current epoch value of the logical version of the filesystem in the version table in persistent storage, and monotonically incrementing a current filesystem epoch value. The object epoch value pair preferably determines a range of logical filesystem versions in which the object is valid.

In a fifth aspect of the invention, a data storage system is provided. Filesystem logic is embedded within server software of a node adapted to run a single operating system instance. The filesystem logic is adapted to communicate with metadata of local storage of the node. The system includes a logical filesystem version identified by an epoch value, and a filesystem object identified by a pair of epoch values. A version table is used to maintain a list of all valid filesystem epoch values. Each listed epoch value corresponds to a valid logical version of the filesystem. A version manager is provided to create a near-instantaneous logical verison of the filesystem at a single point-in-time. The current epoch value associated with a current logical verison of the filesystem is adapted to be stored in the version table in persistent storage. In addition, the version manager monotonically increases a current filesystem epoch values. The object epoch value pair preferably determines a range of a logical version of the filesystem in which the object is valid.

In a sixth aspect of the invention, an article in a computer-readable signal-bearing medium is provided. Means in the medium for running filesystem logic within server software of a node running a single operating system instance is provided. The logic is adapted to communicate with metadata of local storage media of the node. Means in the medium for assigning an epoch value to a logical version of a filesystem and for assigning pair of epoch values to a filesystem object is provided. In addition, means in the medium for maintaining a version table of all valid filesystem epoch value is provided, with each listed epoch value corresponding to a valid logical version of the filesystem. Finally, means in the medium for creating a near-instantaneous logical version of the filesystem at a single-point-in-time is provided. The filesystem creation means stores a current epoch value of the logical version of the filesystem in the version table in persistent storage and monotonically increments a current filesystem epoch value. The object epoch value pair preferably determines a range of a logical version of the filesystem in which the object is valid.

In a seventh aspect of the invention, a method of managing logical versions of a filesystem are provided. Filesystem logic is embedded within server software of a server node in communication with a shared storage system. The system includes a logical filesystem version identified by an epoch value, and a filesystem object identified by a pair of epoch values. A version table is used to maintain a list of all valid filesystem epoch values. Each listed epoch value is adapted to correspond to a valid logical version of the filesystem. A version manager is provided to create a near-instantaneous logical verison of the filesystem at a single point-in-time. The current epoch value associated with a current logical verison of the filesystem is adapted to be stored in the version table in persistent storage. In addition, the version manager monotonically increments a current filesystem epoch value. The object epoch value pair preferably determines a range of a logical version of the filesystem in which the object is valid.

In an eighth aspect of the invention, a data storage system is provided. Filesystem logic is embedded within server software of a server node in communication with a shared storage system. The logic is adapted to communicate with metadata space of the shared storage system. The system includes a logical filesystem version identified by an epoch value, and a filesystem object identified by a pair of epoch values. A version table is used to maintain a list of all valid filesystem epoch values. Each listed epoch value corresponds to a valid logical version of the filesystem. A version manager is provide to create a near-instantaneous logical verison of the filesystem at a single point-in-time. The current epoch value associated with a current logical verison of the filesystem is adapted to be stored in the version table in persistent storage. In addition, the version manager monotonically increases a current filesystem epoch value. The object epoch value pair preferably determines a range of a logical version of the filesystem in which the object is valid.

In a ninth aspect of the invention, an article in a computer-readable signal-bearing medium is provided. Means in the medium for running filesystem logic within server software of a server node in communication with a shared storage system is provided. The logic is adapted to communicate with metadata of the shared storage system. Means in the medium for assigning an epoch value to a logical version of a filesystem and for assigning a pair of epoch values to a filesystem object is provided. In addition, means in the medium for maintaining a version table of all valid filesystem epoch values is provided, with each listed epoch value corresponding to a valid logical version of the filesystem. Finally, means in the medium for creating a near-instantaneous logical version of the filesystem at a single-point-in-time is provided. The filesystem creation means stores a current epoch value of the logical version of the filesystem in the version table in persistent storage and monotonically increments a current filesystem epoch value. The object epoch value pair preferably determines a range of a logical version of the filesystem in which the object is valid.

In all of the aspects of the invention, the epoch value can be any incrementable value such as, but not necessarily, a number.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a server, a filesystem is provided, wherein the filesystem is in the form of a subtree rooted at a particular directory. The root of the tree describes the filesystem tree rooted at the root directory and provides the capability for all clients to have a consistent view of the name tree. Logical versions of the filesystem are maintained at the directory level. Each logical filesystem version is assigned a unique number, hereinafter an epoch number, in the form of an integer. When a filesystem is initially created it has an epoch number of one. Every time a logical version of the filesystem is created, such as when a command is issued to create a logical version of the filesystem, the epoch number is incremented. In addition to the epoch number of the filesystem, all objects in the filesystem have an object identifier and two epoch numbers. The first object epoch number is referred to as the birth epoch number, and the second object epoch number is referred to as the death epoch number. The birth and death epoch numbers define the lifespan of the object to which they are assigned. An object in the filesystem is accessed by it's object identifier and birth epoch number. A data structure with a version table for organizing logical versions of the filesystem is maintained to identify the logical versions of the filesystem persistently stored. Accordingly, there is an epoch number assigned to the filesystem, and two epoch numbers assigned to a filesystem object.

Technical Background

Figure 1:
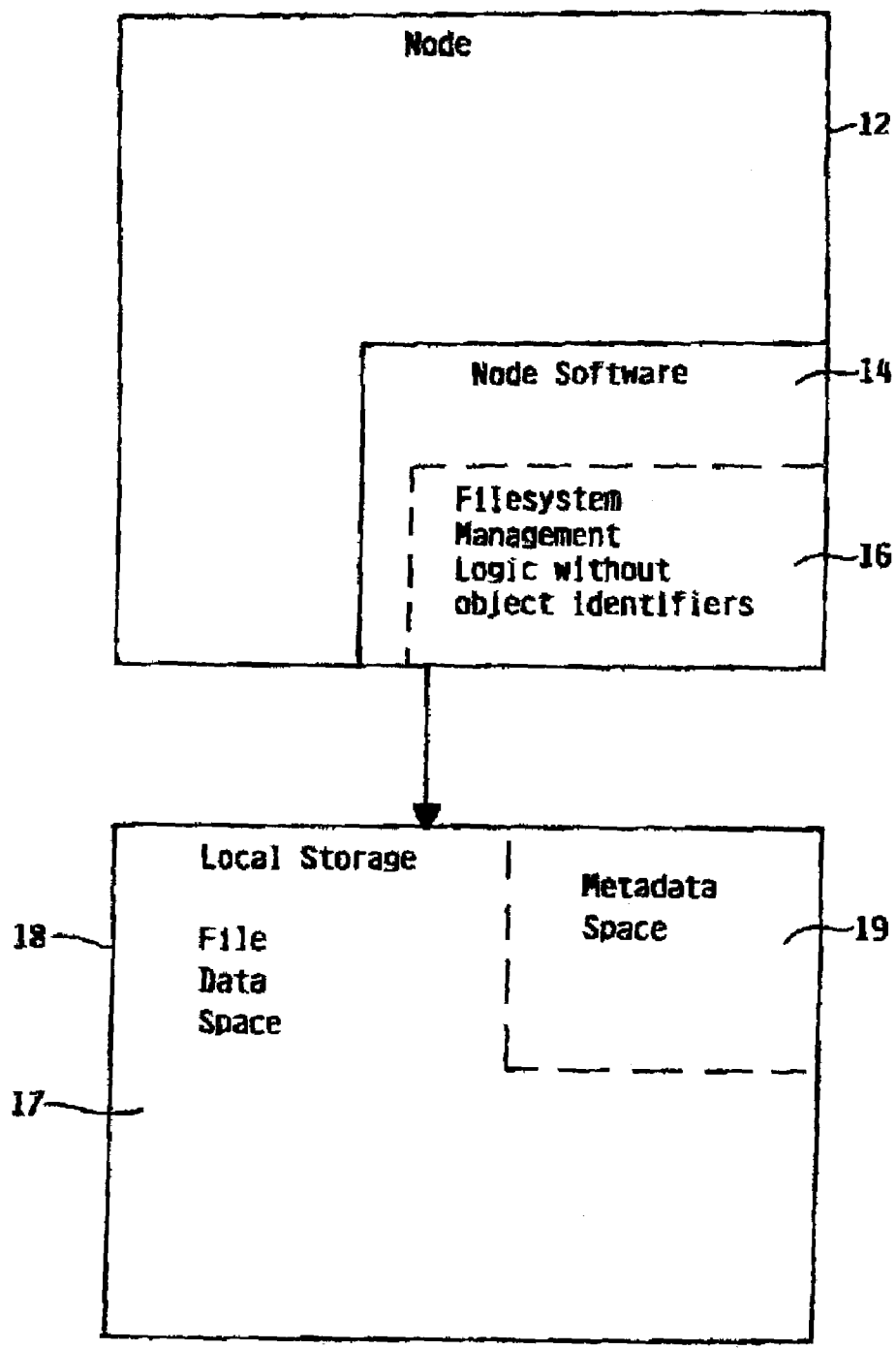
FIG. 1 is a prior art block diagram of a single node with filesystem management logic.
Figure 2:
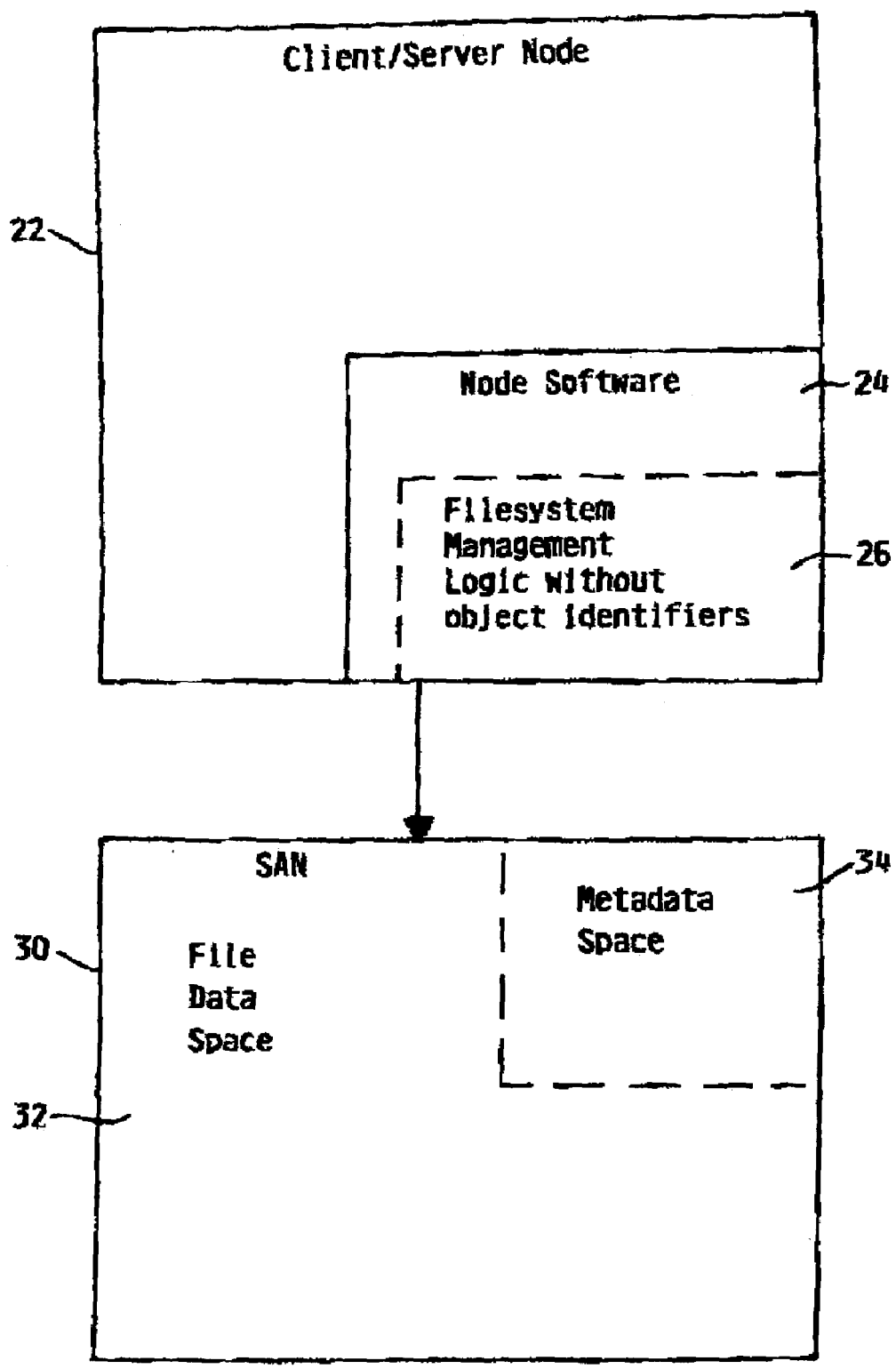
FIG. 2 is a prior art block diagram of a computer system with a server node with filesystem management logic in communication with a storage area network.
Figure 3:
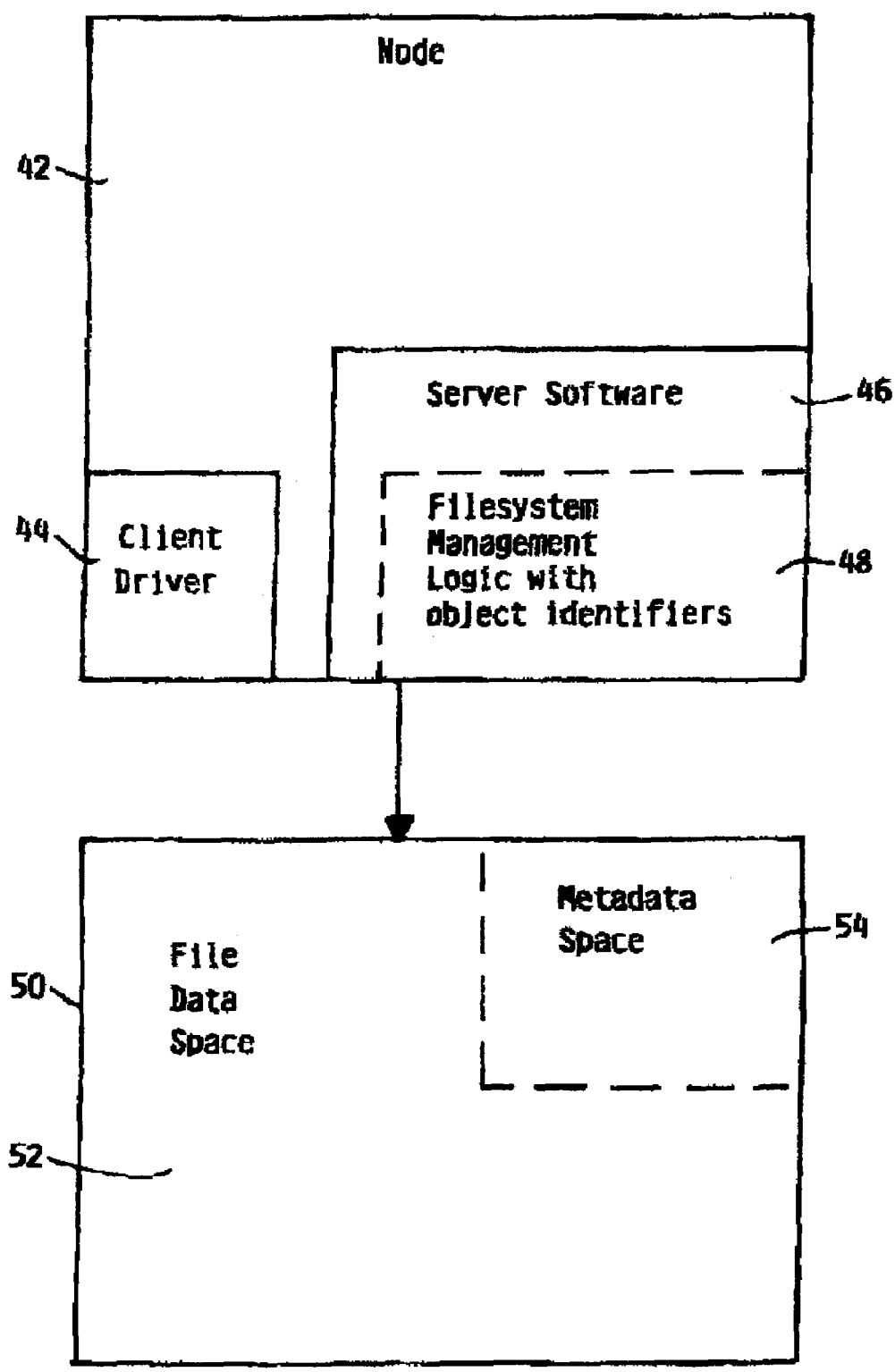
FIG. 3 is a block diagram of a computer system with a single node with filesystem management logic according to the preferred embodiment of the invention.

FIG. 3 is a block diagram 40 of a node 42 running a single operating system instance filesystem management logic according to the preferred embodiment. The node 42 has a client driver 44 and server software 46. The server software 46 of the node 42 includes filesystem management logic 48 embedded within the software of the node. The function of the filesystem management logic 48 is to assign an identifying number to the logical version of the filesystem, and to assign two identifying numbers to a filesystem object. The identifying numbers of the filesystem object(s) determine a range of logical filesystem versions in which the object is valid.

Figure 4:
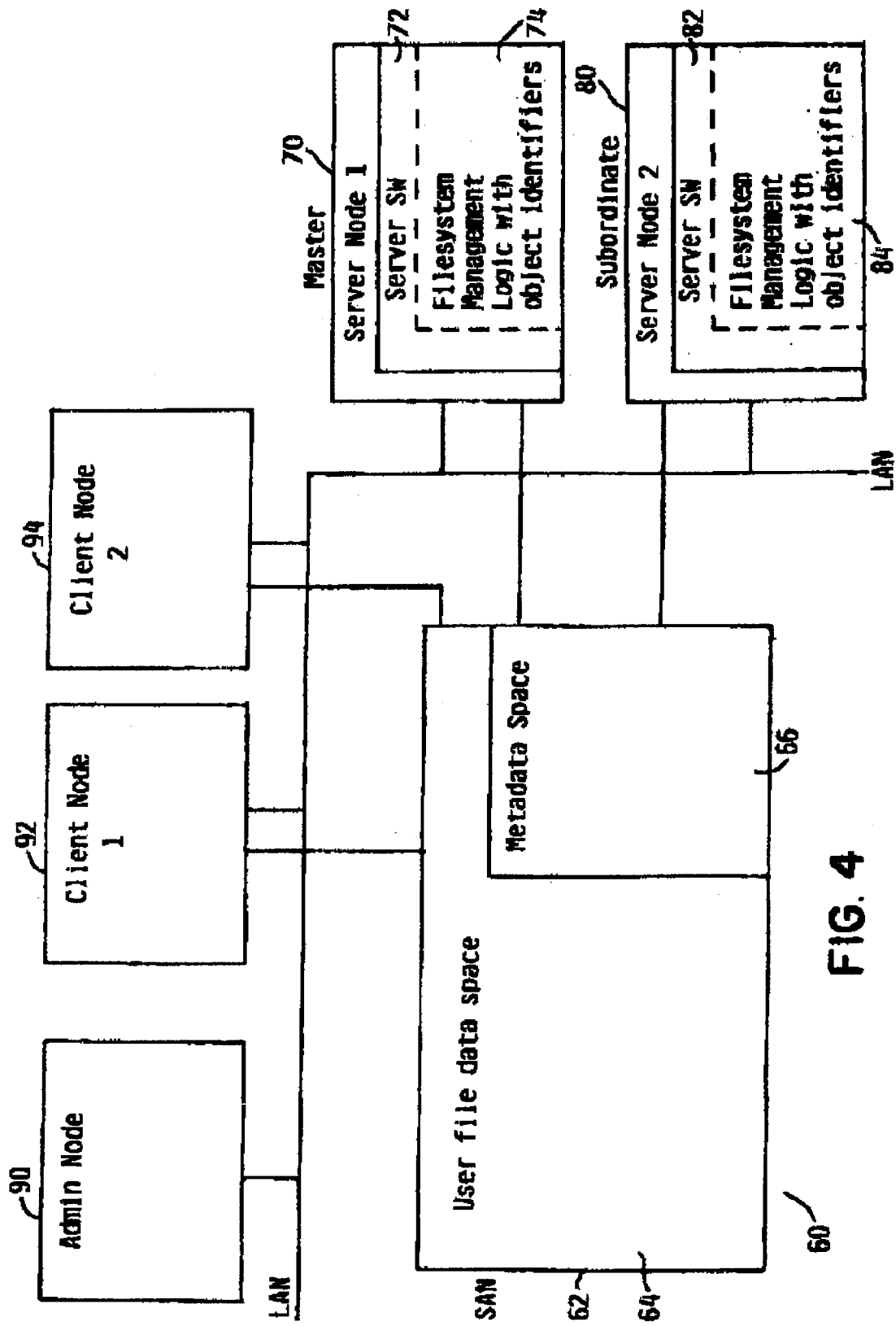
FIG. 4 is a block diagram of a computer system with a server node with filesystem management logic according to the preferred embodiment of the invention, wherein the server node is in communication with a storage area.

Similarly, FIG. 4 is a block diagram 60 of a distributed system with shared persistent storage and embedded filesystem management logic according to the preferred embodiment of the invention. The distributed system includes a storage area network 62 with multiple server nodes 70 and 80, an administrator node 90, and multiple client nodes 92 and 94. The storage area network 62 has file data space 64 and metadata space 66. The metadata space is reserved for the server nodes 70 and 80. Each of the client nodes 92 and 94 may access an object or multiple objects stored on the file data space 64 of the storage area network 62, but may not access the metadata space 66. In opening the contents of an existing file object on the storage media in the storage area network 62, a client contacts the server node to obtain metadata and locks. Metadata supplies the client with information about a file, such as its attributes and location on storage devices. Locks supply the client with privileges it needs to open a file and read or write data. The server node performs a look-up of metadata information for the requested file within the metadata space 66 of the storage area network 62. The server nodes 70 or 80 communicate granted lock information and file metadata to the requesting client node, including the location of the data blocks making up the file. Once the client node holds a distributed lock and knows the data block location(s), the client can access the data for the file directly from a shared storage device attached to the storage area network. In addition, each of the server nodes 70 and 80 includes server software 72 and 82, respectively, with embedded filesystem management logic 74 and 84, respectively. The filesystem management logic enables the server to produce logical versions of the filesystems they are managing. In addition, the logic assigns an identifying number to the logical version of the filesystem, and assigns two identifying numbers to the filesystem objects. The object identifying numbers determine a range of logical filesystem versions in which the object is valid.

Figure 5:
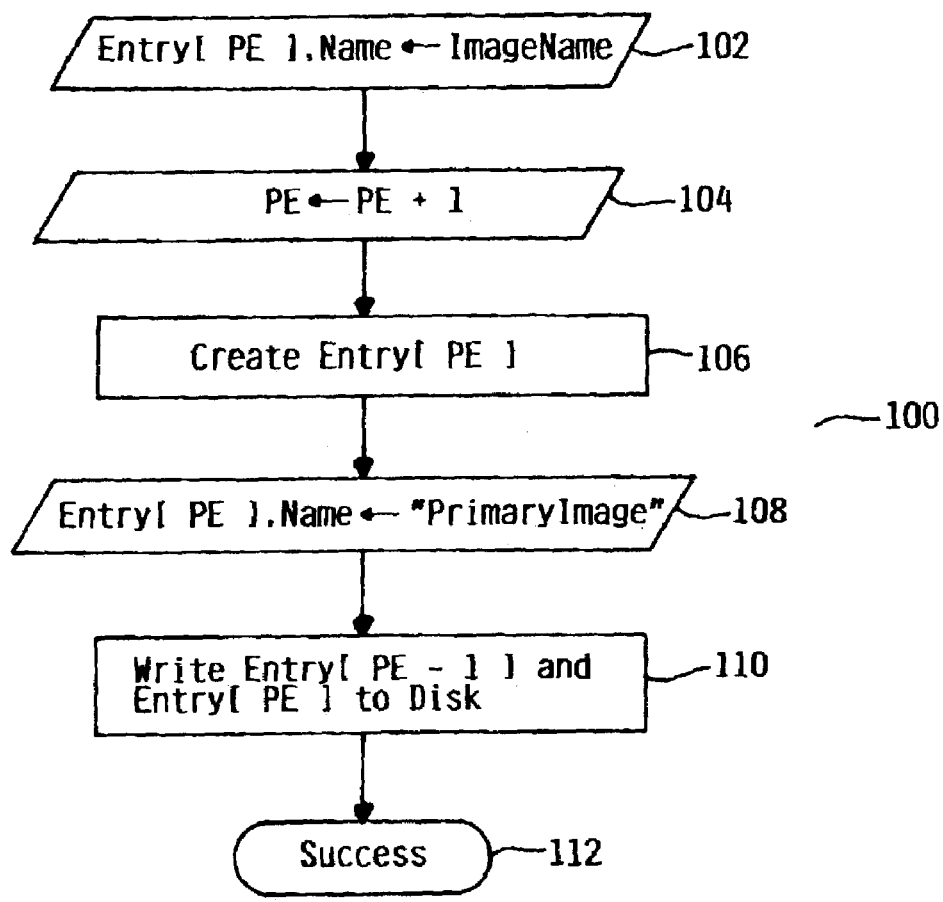
FIG. 5 is a flow chart illustrating the process of creating a near-instantaneous version of a filesystem according to the preferred embodiment of this invention, and is suggested for printing on the first page of the issued patent.

FIG. 5 is a flow chart 100 illustrating the a near-instantaneous process of creating a logical version of a filesystem. The new logical version of the filesystem is assigned an image name 102. The logical version of the filesystem is assigned the former epoch number of the filesystem, and the epoch number of the primary image is incremented by one integer 104. An entry in the version table is created for the new epoch number identifier of the filesystem 106. The data structure maintains a list of all epoch number identifiers that are valid for a filesystem. Following entry of the new epoch number identifier into the data structure, a data assignment of the primary image is entered 108. The epoch number identifier of the primary image and the primary epoch number identifier of the logical version of the filesystem are then written to persistent storage 110. Following step 110, the creation of the logical version of the filesystem is successfully completed 112. Accordingly, a near-instantaneous process of creating a logical version of a filesystem includes maintaining the epoch number identifiers of the primary image and the near-instantaneous logical version of the filesystem in persistent storage.

Figure 6:
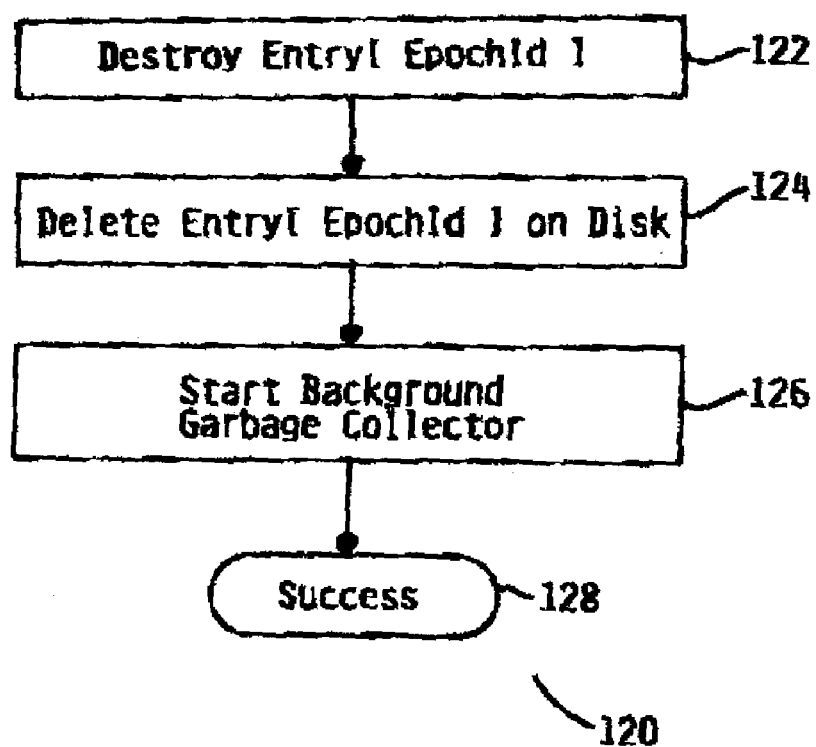
FIG. 6 is a flow chart illustrating the process of a near-instantaneous removal of a logical version of the filesystem.

In addition to creating logical versions of a filesystem, logical versions of the filesystem may also be removed from the version table through a near-instantaneous process. FIG. 6 is a flow chart 120 illustrating the process of a near-instantaneous removal of a logical version of the filesystem from memory and persistent storage. The operator provides the epoch number identifier associated with the logical version of the filesystem that is selected for removal from the version table. The entry for the primary epoch number identifier is removed from the version table 122, followed by deletion of the entry for the identified logical filesystem version from persistent storage 124. Subsequently, a background process is initiated to remove all non-referenced objects that were a part of the logical filesystem version from the version table and persistent storage. Following step 126, removal of the specified logical filesystem version is complete 128. Accordingly, the process for removing a logical version of the filesystem from memory and persistent storage includes removing the corresponding epoch number identifier associated with the logical filesystem version from the version table.

Figure 7:
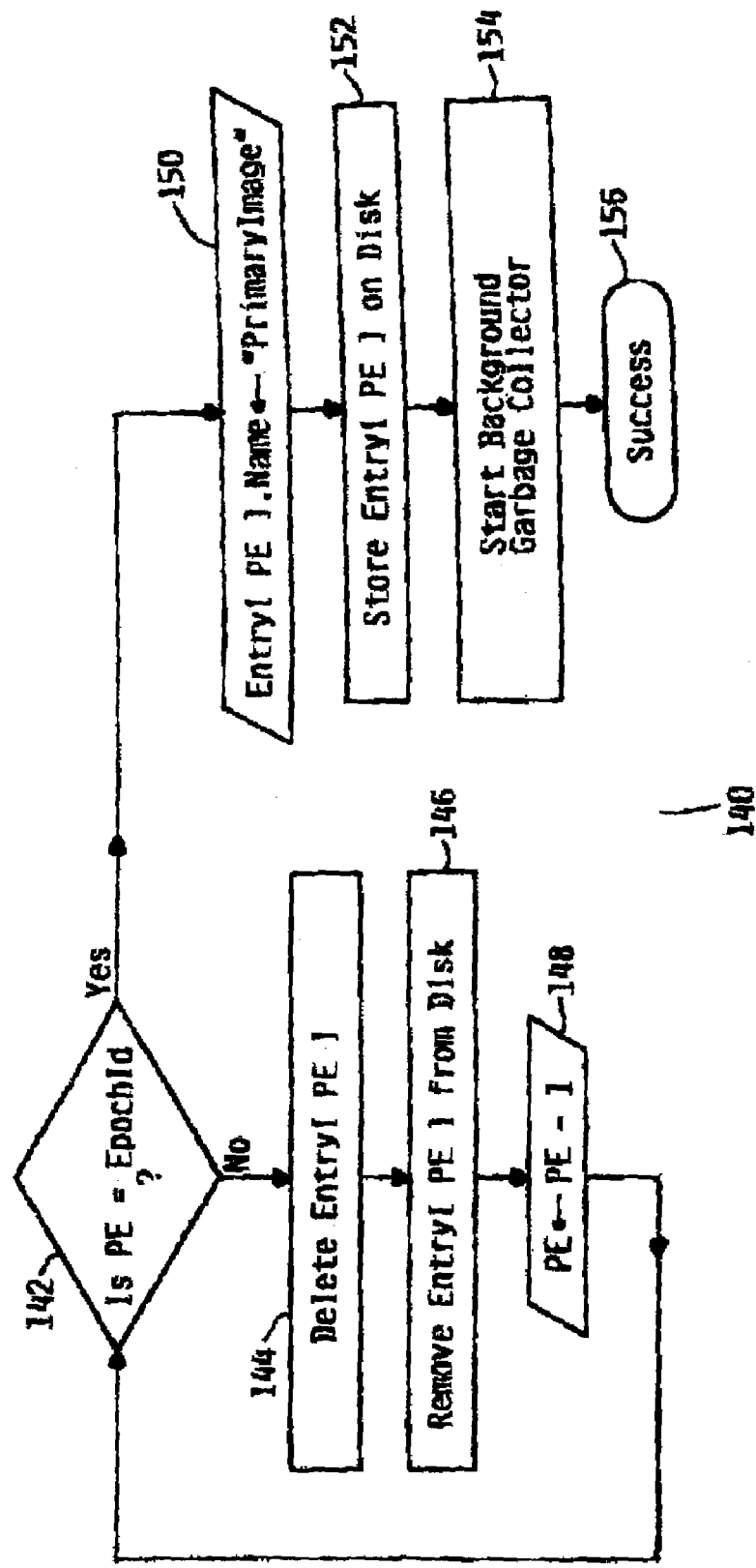
FIG. 7 is a flow chart illustrating the process of a near-instantaneous reversion to a logical version of the filesystem.

In addition to removing a logical version of a filesystem from memory and persistent storage, an operator may choose to revert to a specific logical filesystem version. FIG. 7 is a flow chart 140 illustrating the process of a near-instantaneous reversion to a specific logical version of the filesystem. A specific epoch number identifier to which the operator wants to revert is input as a search parameter. A test is then conducted to determine if the primary epoch number identifier of the filesystem is the same as the search parameter 142. If the response to the test at step 142 is negative, the entry for the epoch number identifier is removed from the version table 144, i.e. from memory. Thereafter, the entry for the epoch number identifier is removed from persistent storage 146. The epoch number identifier in the version table is now decremented to one integer less than the previously removed entry in-memory and in persistent storage 148. The algorithm then returns to the test at step 142 until the entry for the epoch number identifier is the same as the input parameter. If the response to the test at step 142 is positive, the logical version of the filesystem associated with the primary image epoch number identifier becomes the new primary image 150. The process at step 150 includes marking an entry in the version table for the new primary image. The new primary image is also stored in persistent storage 152. Subsequently, a background process is initiated to remove non-referenced objects from the version table and persistent storage 154. Following step 154, reversion to the specified logical version of the filesystem is complete 156. Accordingly, the process of a near-instantaneous reversion to a logical version of a filesystem includes removing all intervening logical filesystem versions in the version table and in persistent storage, and setting the primary epoch number identifier to the epoch number identifier being reverted to.

Each filesystem includes objects in the form of files, directories, symbolic links, etc. All filesystem objects are stored in btree records, wherein each record describes one or more object instances that are identical. Filesystem objects can be stored in other persistent data structures provided they are cluster on their keys, and support efficient lookup and scan access methods. Filesystem objects do not require modification as part of the process of creating a logical version of a filesystem. Similarly, when a logical version of a filesystem is removed or reverted to, the filesystem objects do not require modification. Non-referenced objects are removed as a result of removing or reverting to logical versions of a filesystem, however this is done by a separate background process that is triggered by the remove or revert processes. If a filesystem object is not modified subsequent to creating a logical version of a filesystem, then no additional space is required to store the object in the logical filesystem version. Accordingly, a single record in the btree can represent an unlimited quantity of identical instances of an object without requiring any additional storage.

Figure 8:
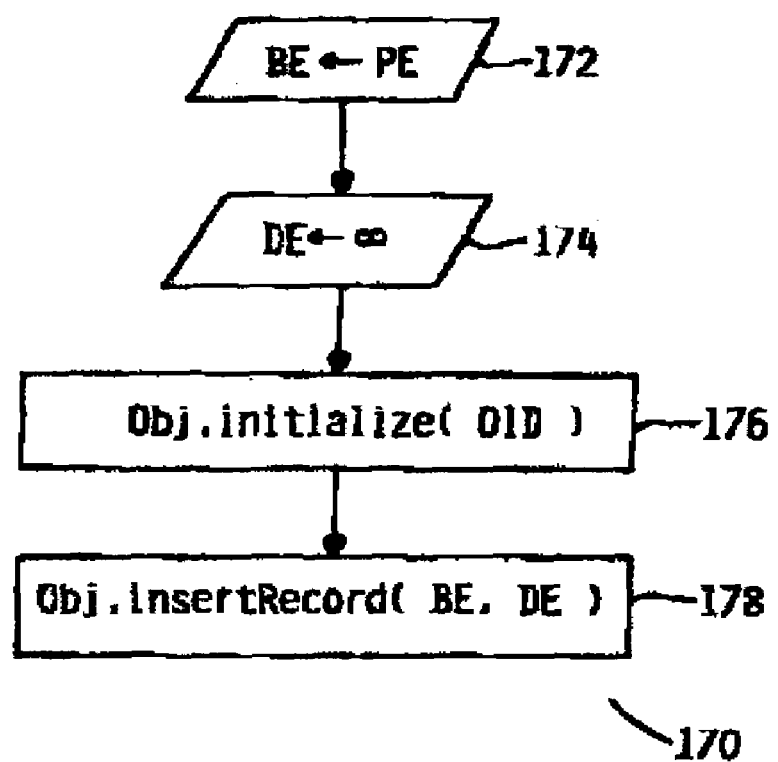
FIG. 8 is a flow chart illustrating the process of inserting an object into the filesystem.

FIG. 8 is a flow chart 170 illustrating the process of creating a filesystem object. Each object in a filesystem is identified by two epoch numbers, a birth epoch number and a death epoch number. The first step in creating a filesystem object is to assign the birth epoch number to the object. The assigned birth epoch number is the primary epoch number identifier of the filesystem 172. The assigned death epoch number is infinity 174. The filesystem object is then initialized with an object identifier 176. Following assignment of the birth epoch number and death epoch number to the filesystem object and initialization of the object identifier, the filesystem object is inserted into the btree as a record 178. Accordingly, the process of creating a filesystem object as a record in the btree requires assigning identifying protocols to each filesystem object.

Figure 9:
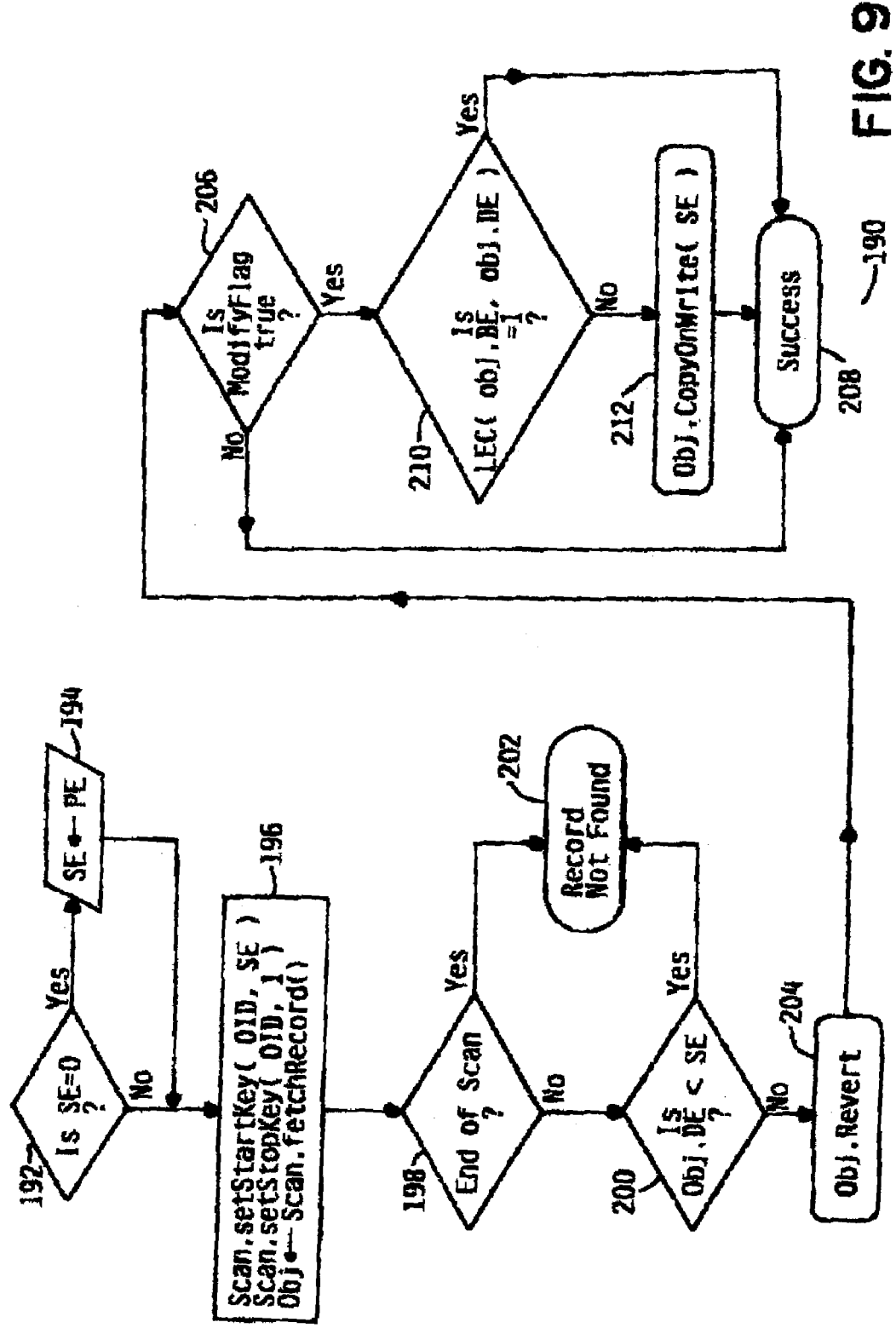
FIG. 9 is a flow chart illustrating the process of looking up an identified object of the filesystem.

Each object is stored in the btree record with a two part key. The first part of the key is the object identifier, as is initialized at step 176, and the second part of the key is the birth epoch number, as created at step 172. The object identifier is sorted in increasing order, and the birth epoch number is sorted in decreasing order. FIG. 9 is a flow chart 190 illustrating the process of looking up an object stored in the btree. The operator enters the object identifier and the epoch number to be searched as the primary search elements, in conjunction with an indication of whether the searched object is intended for modification. Following entry of the search parameters, a test 192 is conducted to determine if the epoch number being searched has a value of zero. When a search epoch identifier of zero is requested, the epoch number of the filesystem is substituted as the search epoch number value 194. Following the substitution of the primary epoch number at step 194 or a determination that the search epoch identifier is not zero, a scan of the btree is conducted 96. The start key of the scan has a first parameter of the object identifier and a second parameter of the search epoch number. The stop key of the scan has a first parameter of the object identifier and a second parameter of one. The btree is scanned forward and will return the first record it finds for the object identifier. The returned record will have the property of the birth epoch number of the object being less than or equal to the search epoch identifier. A test is conducted to determine if the scan is completed 198. If the response to the test at step 198 is negative, a subsequent test is conducted to determine if the death epoch number of the returned record is less than the search epoch identifier 200. A positive response to the test at steps 198 or 200 is an indication that the record was not found within the scanned range 202 as provided at step 196. However, a negative response to the test at step 200 is an indication that the returned object is valid, and the returned object undergoes a reversion process at 204. Accordingly, the first part of the process of looking up a record in the btree is to revert to the object identified within the input parameters.

Following reversion to the identified object at step 204, a test is conducted to determine if an indicator was provided that the caller will modify the returned object 206. A negative response to the test at step 206, is an indication that the operator wanted to locate the specified object, but does not require any modification to it. If no modification to the object is required, the object location and reversion is complete 208. However, a positive response to the test at step 206, will result in a reference count to determine if the returned record describes a unique object 210. In conducting the calculation of a reference count, the birth epoch number and death epoch number of the object are known. An in-memory scan of all version table entries ranging from the birth epoch number to the death epoch number is performed providing a count of the number of entries in that range, referred to as the reference count. If the reference count is greater than one, then the record does not describe a unique object and a copy-on-write procedure is required 212 before the record can be modified. Accordingly, the process of modifying the returned object from step 204 requires the calculation of a reference count to determine if the returned record describes a unique object since only a record describing a unique object may be modified.

Figure 11:
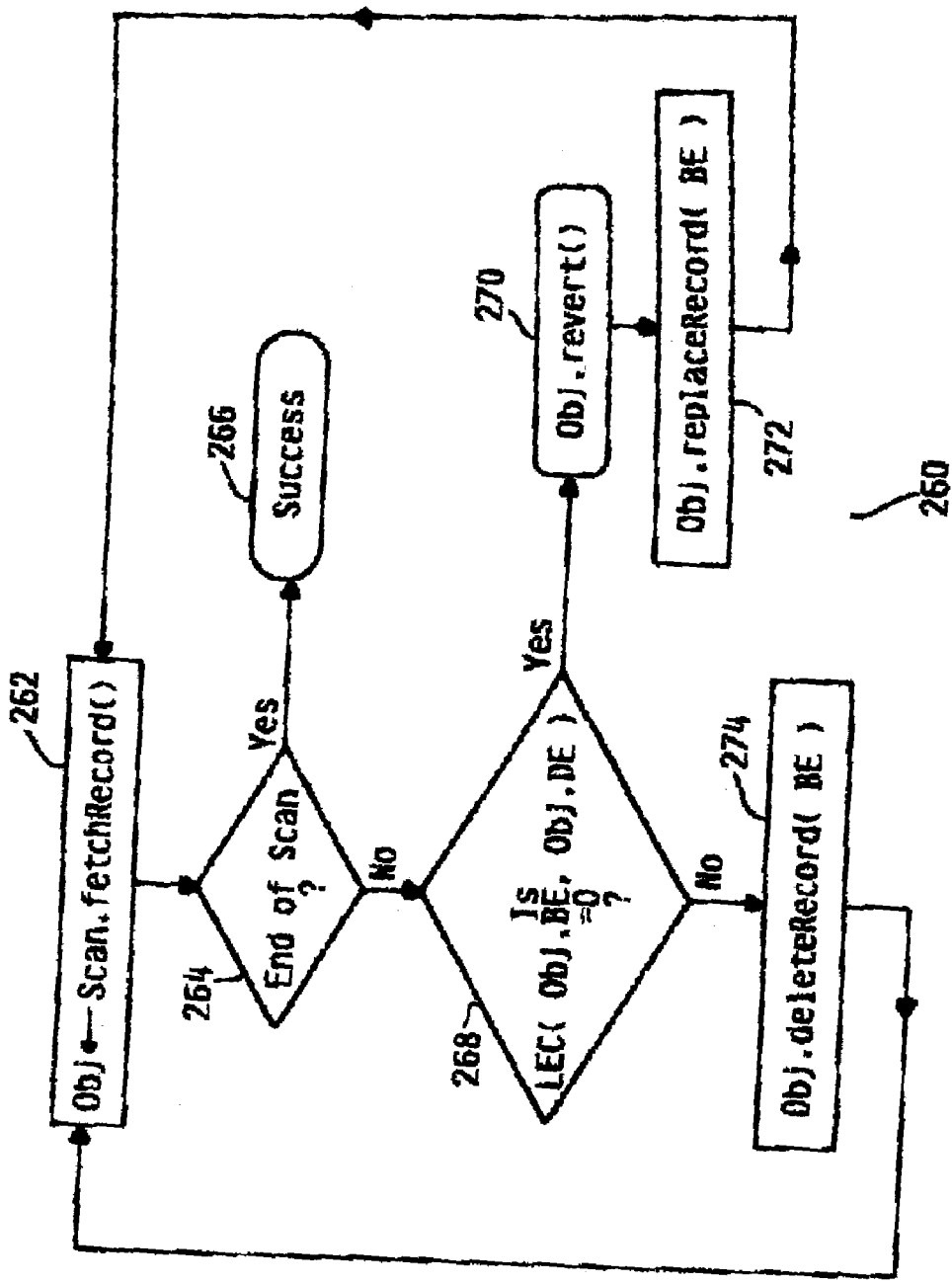
FIG. 11 is a flow chart illustrating the process of removing non-referenced filesystem objects.

As noted in FIGS. 8 and 9, each object of a filesystem is stored as a record in a btree. During the process of reverting to a specific logical filesystem version or removing a specific logical filesystem version, a background process for removing non-referenced objects from the btree is initiated. For example, after the primary image has been reverted to in FIG. 7, the btree housing the object records will contain records for object instances that do not exist. The btree is not affected by these records, as they will not be read during a look-up procedure. FIG. 11 is a flow chart 260 illustrating the process of removing non-referenced logical versions of a filesystem object from persistent storage during the process of a near-instantaneous removal of or reversion to a logical version of a filesystem a shown at step 154 of FIG. 7 and step 126 of Fig. 6. The process is initiated with a scan of all records of all logical filesystem versions in persistent storage 262. Thereafter, a test is conducted to determine if the scan has returned an object 264. If no object was returned, the scan is complete 266. However, if an object was returned from the scan, a reference count is calculated for the object 268. A reference count of zero is an indication that the object is not referenced by other objects, and the record is deleted 274. Thereafter, the process returns to step 262 to continue the scanning process. However, if the reference count returns at least one object referencing the object identified at step 268, that referenced object is reverted to 270, and the referenced object record is replaced with the birth epoch number 272. Thereafter, the process returns to step 262 to continue the scanning process. If the removal of the non-referenced logical version of the filesystem shown in. FIG. 11 was initiated in response to a revert procedure, then no additional logical versions of the filesystem may be created until the process outline in FIG. 11 is completect This requirement prevents erroneous btree records from appearing to be part of the primary image. Alternatively, if the removal of non-referenced logical versions of the filesystem shown in FIG. 11 was in response to the process of a near-instantaneous removal of a logical version of the filesystem then additional logical versions of the filesystem may be created. Accordingly, the process for removing non-referenced objects of a filesystem removes all records in the btree with a birth epoch number greater than the epoch number of the current filesystem following a reversion to a specified logical filesystem version.

Figure 10:
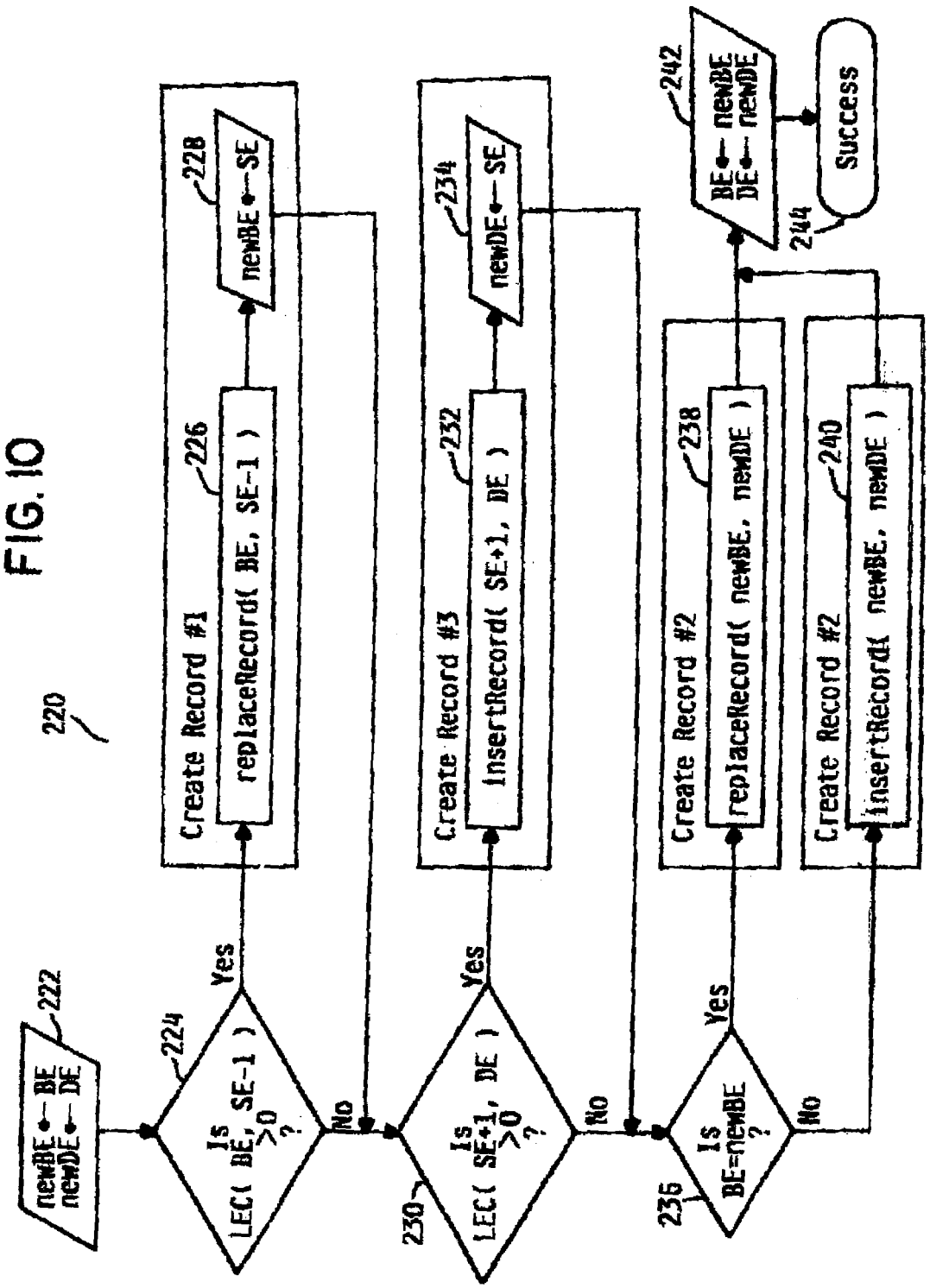
FIG. 10 is a flow chart illustrating the process of conducting a copy-on-write procedure to a referenced filesystem objects.

In addition to removing versions of non-referenced filesystem objects as shown in FIG. 11, referenced filesystem objects may be modified. However, only filesystem objects that are unique may be modified. A filesystem object that is valid in multiple filesystem versions must proceed through a copy-on-write procedure before a modification may be conducted. FIG. 10 is a flow chart 220 illustrating the process of conducting the copy-on-write procedure for a record that does not describe a unique object, as identified in step 212 of FIG. 9. This procedure entails creating either two or three records for the identified object to preserve the data in the non-primary image. Three records are created when the intention is to modify a preserved non-primary image. Generally non-primary images may not be modified since their contents must be preserved to maintain the integrity of the logical versions of the filesystem. However, in a production system, occasional maintenance is required and support for performing copy-on-write for a non-primary image is provided to facilitate such maintenance. Examples where this might be used are in filesystem checking and repair, or to update a file object that has data blocks residing in persistent storage that has failed. The first step in the copy-on-write procedure is to assign a local variable a new birth epoch number the value of the original object's birth epoch number and to assign a local variable a new death epoch number the value of the original object's death epoch number to the identified object 222. A reference count with a first parameter of the birth epoch number and a second parameter of the search epoch number less one is then calculated 224, known as the before record. The before record, which will have a birth epoch number equal to the original birth epoch number, and a death epoch number equal to the search epoch number minus one, will be created in memory and will be written to persistent storage 226. Since the birth epoch number of the before record was not changed, a btree record already exists with the before record's key, therefore the replace record operation is used, which modifies the data associated for a pre-existing key. Thereafter, the new birth epoch number is assigned the search epoch number. Following the assignment at step 228 or a response to the reference count at step 224 of a value not greater than zero, a reference count with the first parameter of the search epoch number incremented by one integer and the second parameter of the death epoch number is then conducted 230. A referenced count at step 230 of a value greater than zero will result in creation of a third record, the after record. The after record, which will have a birth epoch number equal to the search epoch number plus one, and a death epoch number equal to the original death epoch number, will be created in memory and will be written to persistent storage 232. Since the birth epoch number of the after record has a new value, no record with the after record's key should exist in the btree, therefore an insert record operation is used to insert a new btree record and key. Thereafter, a new death epoch number is assigned the value of the integer of the search epoch number 234. The remainder of the flow chart (236, 238, 240, and 242) concerns the creation of the middle record. The middle record is created last since this is the record that the caller intends to modify. The middle record will have a birth epoch number equal to the new birth epoch number, assigned at step 22 or 228. The middle record will have a death epoch number equal to the new death epoch number assigned at step 222 or 234. Following the assignment at step 234 or a reference count at step 230 of a value greater than zero, a test 136 is conducted to determine if the birth epoch number of the original record is equivalent to the new birth epoch number assigned at step 222. A positive response to the tests at step 236 will result in replacement of an existing record 238 with the new birth epoch number and the new death epoch number. Alternatively, a negative response to the test at step 236 will result in creation of the middle record 240 in the form of inserting a record into the btree with the parameters of both the new birth epoch number and the new death epoch number. The process of creating the middle record will result in either an insertion of a new record into the btree or replacement of an existing record. The creation of the second record at steps 238 or 240 will result in assignment of the new birth epoch number as the birth epoch number and the new death epoch number as the death epoch number 242. Accordingly, the copy-on-write process enables the object record identified for modification to be divided into either two or three copies, thereby preserving the original state of the filesystem object as it appeared in the prior logical version of the filesystem.

Advantages Over the Prior Art

Once a logical version of the filesystem has been created, it appears as part of the filesystem root directory and can be used by backup utilities to create secondary storage backups while the filesystem remains online. In addition, the logical version of the filesystem can be referenced for file restoration or to maintain a history of the filesystem. The near-instantaneous process of creating a logical version of the filesystem disclosed herein is space efficient. After a logical version of the filesystem has been created, updates to a filesystem object cause a copy-on-write procedure to occur, thereby preserving the original state of the filesystem object as it was prior to the logical filesystem version. Only filesystem objects that change subsequent to the logical filesystem version is taken require additional storage. If a filesystem object is not modified subsequent to creation of a logical filesystem version, then no additional space is required to store the logical version of the filesystem. A single record can represent an unlimited number of identical instances of an object without requiring additional storage. In addition, no additional background processing is required to maintain either the primary image of the filesystem or a logical version of the filesystem. As such, there is no additional cost requirement associated with accessing an object of the primary image as compared to an object referenced in a logical version of the filesystem. Accordingly, the organization and maintenance of the logical versions of the filesystem and associated objects maintains logical versions of the filesystem while preserving an original state of the system.

Alternative Embodiments

Figure 12:
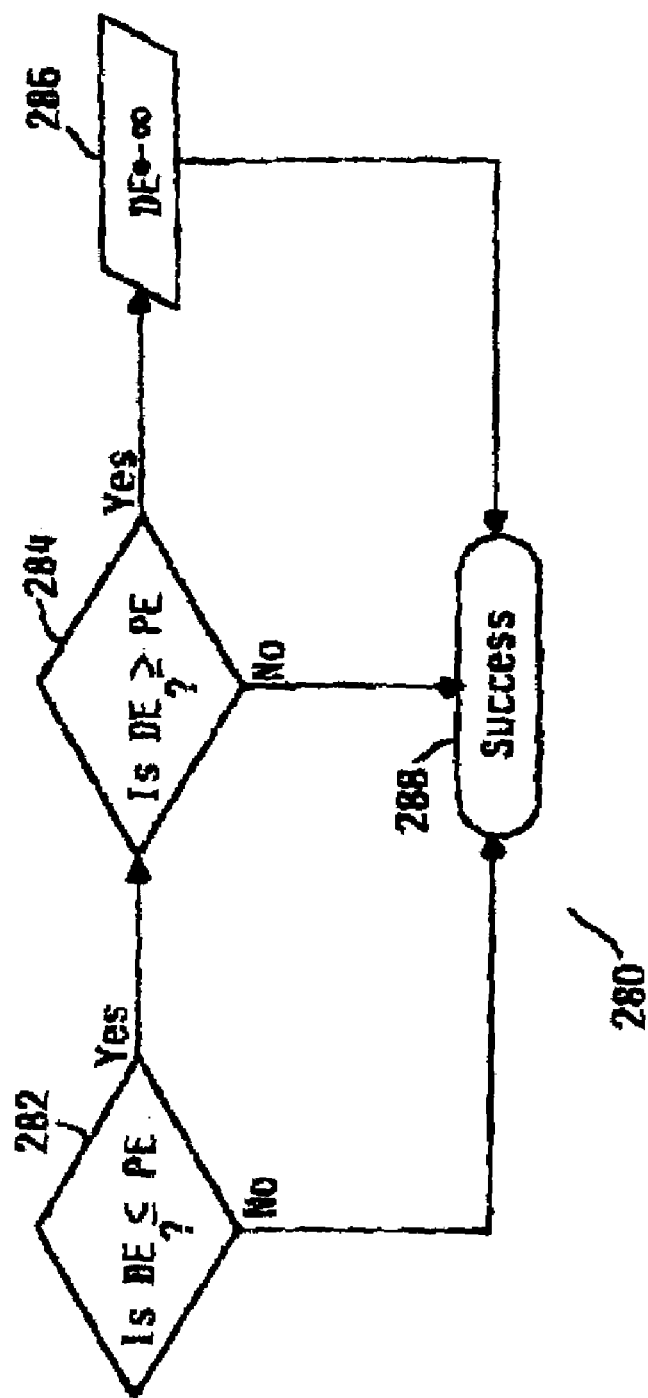
FIG. 12 is a flow chart illustrating the process of resetting the death epoch number of a filesystem object.

It will be appreciated that, although specific embodiments of the invention have been described herein for purposes of illustration, various modifications may be made without departing from the spirit and scope of the invention. In particular, referenced objects in a logical version of the filesystem may have the death epoch number reset to infinity in conjunction with reversion to a specific logical filesystem version as the reverted logical version of the filesystem becomes the new primary image of the filesystem. Any object with the epoch number of the primary image filesystem has a death epoch number of infinity. FIG. 12 is a flow chart 280 illustrating the steps of resetting the death epoch number of the referenced object. A test is conducted 282 to determine if the birth epoch number of the object is less than or equal to the epoch number of the logical version of the filesystem. A positive response to the test at step 282, will be followed by a test 284 to determine if the death epoch number of the object is greater than or equal to the epoch number of the logical version of the filesystem. If the response to the test at steps 282 or 284 is negative, then the death epoch number does not need to be reset 288. However, a positive response to the test at steps 282 and 284 will result in resetting the death epoch number of the object to infinity. The process outlined in FIG. 12 occurs for records with a birth epoch number less than or equal to the epoch number of the logical filesystem version and a death epoch number greater than or equal to the epoch number of the logical filesystem version image as the records are accessed. Finally, the epoch value can be any incrementable value such as an alphabetic character or raw bytes—not necessarily only a number. Accordingly, the scope of protection of this invention is limited only by the following claims and their equivalents.

We claim:

1. A method for managing logical versions of a filesystem, comprising
    (a) assigning an epoch number to a logical version of said filesystem;
    (b) assigning a pair of epoch numbers to a filesystem object, wherein said object epoch number pair determines a range of logical filesystem versions in which said object is valid;
    (c) maintaining a version table of all valid filesystem epoch numbers, each listed epoch number corresponding to a valid logical version of the filesystem; and
    (d) creating a near-instantaneous logical version of said filesystem at a single point-in-time by storing a current epoch number of said logical version of said filesystem in said version table in persistent storage, and monotonically incrementing a current filesystem epoch number.

2. The method of claim 1, wherein the step of creating a near-instantaneous logical version of a filesystem includes limiting additional space of said logical version to multiply referenced changed filesystem objects in said filesystem.

3. The method of claim 1, further comprising maintaining a logical version of the filesystem while preserving an original state of said filesystem.

4. The method of claim 1, further comprising a near-instantaneous removal of said logical version of said filesystem.

5. The method of claim 4, wherein the step of said near-instantaneous removal of said logical version of said filesystem includes removing a corresponding epoch number of said version from said version table in said persistent storage.

6. The method of claim 5, further comprising removing a non-referenced object associated with said removed version.

7. The method of claim 1, further comprising a near-instantaneous reversion to an existing logical version of said filesystem.

8. The method of claim 7, wherein the step of said near-instantaneous reversion to an existing logical version of said filesystem includes removing all intervening entries in said version table in persistent storage and setting the filesystem epoch number to an epoch number corresponding to said reverted logical filesystem version.

9. The method of claim 1, further comprising preserving an original state of the filesystem by performing a copy-on-write procedure in response to modification of a multiply referenced filesystem object.

10. The method of claim 9, wherein the step of performing said copy-on-write procedure includes splitting said filesystem object into three copies in response to modification of a multiply reference filesystem object belonging to a non-primary logical version of said filesystem.

11. A data storage system, comprising:
    a filesystem version identified by an epoch number;
    a filesystem object identified by a pair of two epoch numbers, wherein said object epoch number pair is adapted to determine a range of a logical version of said filesystem in which said object is valid;
    a version table adapted to maintain a list of all valid filesystem epoch numbers, wherein each listed epoch number corresponds to a valid logical version of said filesystem; and a version manager adapted to create a near-instantaneous logical version of said filesystem at a single point-in-time, wherein a current epoch number associated with a current logical version of said filesystem is adapted to be maintained in said version table in persistent storage and a current filesystem epoch number is monotonically incremented.

12. The system of claim 11, wherein a copy manager limits additional space in said logical version to changed objects in said filesystem.

13. The system of claim 11, wherein said version manager is adapted to maintain a logical version of said filesystem while preserving an original state of said filesystem.

14. The system of claim 11, further comprising said version manager adapted to conduct a near-instantaneous removal of said logical version of said filesystem.

15. The system of claim 14, wherein said version manager is adapted to conduct a near-instantaneous removal of a corresponding epoch number of said version from said persistent storage.

16. The system of claim 15, wherein said version manager removes a non-referenced object associated with said removed logical version.

17. The system of claim 11, further comprising said version manager adapted to conduct a near-instantaneous reversion to an existing logical version of said filesystem.

18. The system of claim 17, wherein said version manager is adapted to remove an intervening entry in said version table in persistent storage and to set said filesystem epoch number to an epoch number associated with said reverted logical filesystem version.

19. The system of claim 11, further comprising a record manager adapted to conduct a copy-on-write procedure in response to modification of a multiply referenced filesystem object.

20. The system of claim 19, wherein said record manager splits said record into three copies in response to modification of a multiply referenced filesystem object belonging to a non-primary logical version of said filesystem.

21. An article comprising:
a recordable data storage medium;
means in the medium for assigning an epoch number to a logical version of a filesystem;
means in the medium for assigning a pair of epoch numbers to a filesystem object, wherein said object epoch number pair determines a range of logical filesystem versions in which said object is valid;
means in the medium for maintaining a version table of all valid filesystem epoch numbers, with each listed epoch number corresponding to a valid logical version of the filesystem; and
means in the medium for creating a near-instantaneous logical version of said filesystem at a single point-in-time by storing a current epoch number of said logical version of said filesystem in said version table in persistent storage and monotonically incrementing a current filesystem epoch number.

22. The article of claim 21, further comprising means in the medium for a near-instantaneous removal of said logical version of said filesystem, wherein said means includes a version manager adapted to remove a corresponding epoch number of said filesystem version from said version table in persistent storage.

23. The article of claim 22, further comprising means in the medium for removing a non-referenced object associated with said removed version.

24. The article of claim 21, further comprising means in the medium to for a near-instantaneous reversion to an existing logical version of said filesystem, wherein said means includes a version manager adapted to remove all intervening entries in said version table in persistent storage and to set said filesystem epoch number to an epoch number corresponding to said reverted logical version.

25. The article of claim 21, further comprising means in the medium for performing a copy-on-write procedure in response to modification of a multiply reference filesystem object, wherein said means includes a record manager adapted to split said filesystem object into three copies in response to a modification of a multiply reference filesystem object belonging to a non-primary logical version of said filesystem.

26. The article of claim 21, wherein means in the medium for creating a near-instantaneous logical version of said filesystem at a single point in time is a version manager adapted to limit additional space in said logical version to changed objects in said filesystem.

27. The article of claim 21, further comprising means in the medium for maintaining a logical version of said filesystem while preserving an original state of said filesystem.

28. A method for managing logical versions of a filesystem comprising:
(a) embedding filesystem logic within server software of a node running a single operating instance, wherein said logic is adapted to communicate with metadata space of local storage media of said node;
(b) assigning an epoch number to a logical version of said filesystem;
(c) assigning a pair of epoch numbers to a filesystem object, wherein said object epoch number pair determines a range of logical filesystem versions in which said object is valid;
(d) maintaining a version table of all valid filesystem epoch numbers, each listed epoch number corresponding to a valid logical version of the filesystem; and
(e) creating a near-instantaneous logical version of said filesystem at a single point-in-time by storing a current epoch number of said logical version of said filesystem in said version table in persistent storage of said local storage media, and monotonically incrementing a current filesystem epoch number.

29. The method of claim 28, wherein the step of creating a near-instantaneous logical version of a filesystem includes limiting additional space of said logical version to multiply referenced changed filesystem objects in said filesystem.

30. The method of claim 28, further comprising a near-instantaneous removal of said logical version of said filesystem, wherein a corresponding epoch number of said version is removed from said version table in persistent storage of said local storage media and a non-referenced object associated with said removed version is removed.

31. The method of claim 28, further comprising a near-instantaneous reversion to an existing logical version of said filesystem, wherein all intervening entries in said version table are removed from persistent storage of said local storage media and said filesystem epoch number is set to an epoch number corresponding to said reverted logical filesystem version.

32. The method of claim 28, further comprising preserving an original state of the filesystem by performing a copy-on-write procedure in response to modification of a multiply referenced filesystem object.

33. A data storage system, comprising:
  filesystem logic embedded within server software of a node adapted to run a single operating system instance, wherein said logic is adapted to communicate with metadata of local storage of said node;
  a filesystem version identified by an epoch number;
  a filesystem object identified by a pair of epoch numbers, wherein said object epoch number pair is adapted to determine a range of a logical version of said filesystem in which said object is valid;
  a version table adapted to maintain a list of all valid filesystem epoch numbers, wherein each listed epoch number corresponds to a valid logical version of said filesystem; and
  a version manager adapted to create a near-instantaneous logical version of said filesystem at a single point-in-time, wherein a current epoch number associated with a current logical version of said filesystem is adapted to be maintained in said version table in persistent storage of said local storage media and a current filesystem epoch number is monotonically incremented.

34. The system of claim 33, further comprising said version manager adapted to conduct a near-instantaneous removal of said logical version of said filesystem, wherein said version manager is adapted to remove a corresponding epoch number of said version from said version table in persistent storage of said local storage media and to remove a non-reference object associated with said removed logical version.

35. The system of claim 33, further comprising said version manager adapted to conduct a near-instantaneous reversion to an existing logical version of said filesystem, wherein said version manager is adapted to remove an intervening entry in said version table in persistent storage of said local storage media and to set said filesystem epoch number to an epoch number associated with said reverted logical version.

36. The system of claim 33, further comprising a record manager adapted to conduct a copy-on-write procedure in response to modification of a multiply referenced filesystem object.

37. The system of claim 36, wherein said record manager splits said record into three copies in response to modification of a multiply referenced filesystem object belonging to a non-primary logical version of said filesystem.

38. An article comprising:
  a recordable data storage medium;
  means in the medium for running filesystem logic within server software of a node running a single operating system instance, wherein said logic is adapted to communicate with metadata of local storage media of said node;
  means in the medium for assigning an epoch number to a logical version of a filesystem;
  means in the medium for assigning an object epoch number pair to a filesystem object, wherein said object epoch number pair determines a range of logical filesystem versions in which said object is valid;
  means in the medium for maintaining a version table of all valid filesystem epoch numbers, with each listed epoch number corresponding to a valid logical version of the filesystem;
  means in the medium for creating a near-instantaneous logical version of said filesystem at a single point-in-time by storing a current epoch number of said logical version of said filesystem in said version table in persistent storage of said local storage media, and monotonically incrementing a current filesystem epoch number.

39. The article of claim 38, further comprising means in the medium for a near-instantaneous removal of said logical version of said filesystem, wherein said means includes a version manager adapted to remove a corresponding epoch number of said filesystem version from said version table in persistent storage of said local storage media.

40. The article of claim 38, further comprising means in the medium to for a near-instantaneous reversion to an existing logical version of said filesystem, wherein said means includes a version manager adapted to remove all intervening entries in said version table in persistent storage of said local storage media and to set said filesystem epoch number to an epoch number corresponding to said reverted logical filesystem version.

41. The article of claim 38, further comprising means in the medium for performing a copy-on-write procedure in response to modification of a multiply referenced object belonging to a non-primary logical version of said filesystem.

42. The article of claim 41, wherein said copy-on-write procedure means includes a record manager adapted to split said filesystem object into three copies in response to a modification of a multiply referenced filesystem object belonging to a non-primary logical version of said filesystem.

43. The article of claim 38, wherein means in the medium for creating a near-instantaneous logical version of said filesystem at a single point in time is a version manager adapted to limit additional space in said logical version to changed objects in said filesystem.

44. A method for managing logical version of a filesystem, comprising:
  (a) embedding filesystem logic within server software of a server node in communication with a shared storage system, wherein said logic is adapted to communicate with metadata of said shared storage system;
  (b) assigning an epoch number to a logical version of said filesystem;
  (c) assigning a pair of epoch numbers to a filesystem object, wherein said object epoch number pair determines a range of logical filesystem versions in which said object is valid;
  (d) maintaining a version table of all valid filesystem epoch numbers, each listed epoch number corresponding to a valid logical version of the filesystem; and
  (e) creating a near-instantaneous logical version of said filesystem at a single point-in-time by storing a current epoch number of said logical version of said filesystem in said version table in persistent storage of said shared storage system, and monotonically incrementing a current filesystem epoch number.

45. The method of claim 44, wherein the step of creating a near-instantaneous logical version of a filesystem includes limiting additional space of said logical version to changed objects in said filesystem.

46. The method of claim 44, further comprising a near-instantaneous removal of said logical version of said filesystem, wherein a corresponding epoch number of said version is removed from said version table in persistent storage of said shared storage system and a non-referenced object associated with said removed version is removed.

47. The method of claim 44, further comprising a near-instantaneous reversion to an existing logical version of said filesystem, wherein all intervening entries in said version table are removed from persistent storage of said shared storage system and said filesystem epoch number is set to an epoch number corresponding to said reverted logical filesystem version.

48. The method of claim 44, further comprising preserving an original state of the filesystem by performing a copy-on-write procedure in response to modification of a multiply referenced filesystem object.

49. A data storage system, comprising:
filesystem logic embedded within server software of a server in communication with a shared storage system, wherein said logic is adapted to communicate with metadata of said shared storage system;
a filesystem version identified by an epoch number;
a filesystem object identified by a pair of epoch numbers, wherein said object epoch number pair determines a range of a logical version of said filesystem in which said object is valid;
a version table adapted to maintain a list of all valid filesystem epoch numbers, wherein each listed epoch number corresponds to a valid logical version of said filesystem; and
a version manager adapted to create a near-instantaneous logical version of said filesystem at a single point-in-time, wherein a current epoch number associated with a current logical version of said filesystem is adapted to be maintained in said version table in persistent storage of said shared storage system and a current filesystem epoch number is monotonically incremented.

50. The system of claim 49, further comprising said version manager adapted to conduct a near-instantaneous removal of said logical version of said filesystem, wherein said version manager is adapted to remove a corresponding epoch number of said version from said version table in persistent storage of said shared storage system and to move a non-reference object associated with said removed logical filesystem version.

51. The system of claim 49, further comprising said version manager adapted to conduct a near-instantaneous reversion to an existing logical version of said filesystem, wherein said version manager is adapted to move an intervening entry in said version table in persistent storage of said shared storage system and to set said filesystem epoch number to an epoch number associated with said reverted logical filesystem version.

52. The system of claim 49, further comprising a record manager adapted to conduct a copy-on-write procedure in response to modification of a multiply referenced filesystem object.

53. The system of claim 52, wherein said record manager splits said record into three copies in response to modification of a multiply referenced filesystem object belonging to a non-primary logical version of said filesystem set to be modified.

54. An article comprising:
a recordable data storage medium;
means in the medium for running filesystem logic within server software of a server node in communication with a shared storage system, wherein said logic is adapted to communicate with metadata of said shared storage system;
means in the medium for assigning an epoch number to a logical version of a filesystem;
means in the medium for assigning a pair of epoch numbers to a filesystem object, wherein said object epoch number pair determines a range of logical filesystem versions in which said object is valid;
means in the medium for storing a version table of all valid filesystem epoch numbers, with each listed epoch number corresponding to a valid logical version of the filesystem;
means in the medium for creating a near-instantaneous logical version of said filesystem at a single point-in-time by storing a current epoch number of said logical version of said filesystem in said version table in persistent storage of said shared storage system, and monotonically incrementing a current filesystem epoch number.

55. The article of claim 54, further comprising means in the medium for a near-instantaneous removal of said logical version of said filesystem, wherein said means includes a version manager adapted to remove a corresponding epoch number of said filesystem version from said version table in persistent storage of said shared storage system.

56. The article of claim 54, further comprising means in the medium to for a near-instantaneous reversion to an existing logical version of the filesystem, wherein said means includes a version manager adapted to remove all intervening entries in said version table in persistent storage of said shared storage system and to set said filesystem epoch number to an epoch number corresponding to said reverted logical filesystem version.

57. The article of claim 54, further comprising means in the medium for performing a copy-on-write procedure in response to modification of multiply reference filesystem object belonging to a non-primary logical version of said filesystem.

58. The article of claim 57, wherein said copy-on-write procedure means includes a record manager adapted to split said filesystem object into three copies in response to a modification of a multiply referenced filesystem object belonging to a non-primary logical version of said filesystem.

59. The article of claim 54, wherein means in the medium for creating a near-instantaneous logical version of said filesystem at a single point in time is a version manager adapted to limit additional space in said logical version to changed objects in said filesystem.

* * * * *